(12) United States Patent
Yang et al.

(10) Patent No.: US 10,227,104 B2
(45) Date of Patent: Mar. 12, 2019

(54) BICYCLE CONTROL DEVICE MOUNTING ASSEMBLY

(71) Applicant: SRAM, LLC, Chicago, IL (US)

(72) Inventors: Chen-Yi Yang, Taichung (TW);
Chih-Min Chang, Taichung (TW);
Nathan Schickel, Carmel, IN (US)

(73) Assignee: SRAM, LLC, Chicago, IL (US)

( * ) Notice: Subject to any disclaimer, the term of this patent is extended or adjusted under 35 U.S.C. 154(b) by 154 days.

(21) Appl. No.: 14/967,444

(22) Filed: Dec. 14, 2015

(65) Prior Publication Data

US 2017/0166280 A1    Jun. 15, 2017

(51) Int. Cl.
*B62K 21/12* (2006.01)
*B62K 23/06* (2006.01)

(52) U.S. Cl.
CPC .............. *B62K 21/12* (2013.01); *B62K 23/06* (2013.01)

(58) Field of Classification Search
CPC ................................ B62K 21/12; B62K 23/06
See application file for complete search history.

(56) References Cited

U.S. PATENT DOCUMENTS

| 6,546,827 | B2 |   | 4/2003  | Irie    |             |
|-----------|----|---|---------|---------|-------------|
| 7,908,940 | B2 | * | 3/2011  | Naka    | B62M 25/08  |
|           |    |   |         |         | 74/473.12   |
| 8,056,439 | B2 | * | 11/2011 | Fukui   | B62K 23/06  |
|           |    |   |         |         | 403/370     |
| 9,120,522 | B1 | * | 9/2015  | Nishino | B62L 3/023  |
| 2006/0266594 | A1 | * | 11/2006 | Tsai | B62K 23/06  |
|           |    |   |         |         | 188/24.22   |
| 2016/0347415 | A1 | * | 12/2016 | Katsura | B62K 21/12 |
| 2017/0166280 | A1 | * | 6/2017  | Yang    | B62K 21/12  |

FOREIGN PATENT DOCUMENTS

| EP | 0035372 A2 | * | 9/1981 | ............ B62K 21/12 |
| FR | 2326324 A1 | * | 4/1977 | ............ B62K 21/12 |

* cited by examiner

*Primary Examiner* — Vicky A Johnson

(57) ABSTRACT

A bicycle control device mounting assembly for mounting a bicycle control device to a bicycle handlebar having a handlebar central axis and a handlebar opening disposed in the handlebar a distance removed from an end of the handlebar. The bicycle control device mounting assembly comprises a connector assembly. The connector assembly comprises a first connector moveable relative to the handlebar central axis within a first mounting adjustment range and a second connector moveable relative to the handlebar central axis within a second mounting adjustment range.

34 Claims, 16 Drawing Sheets

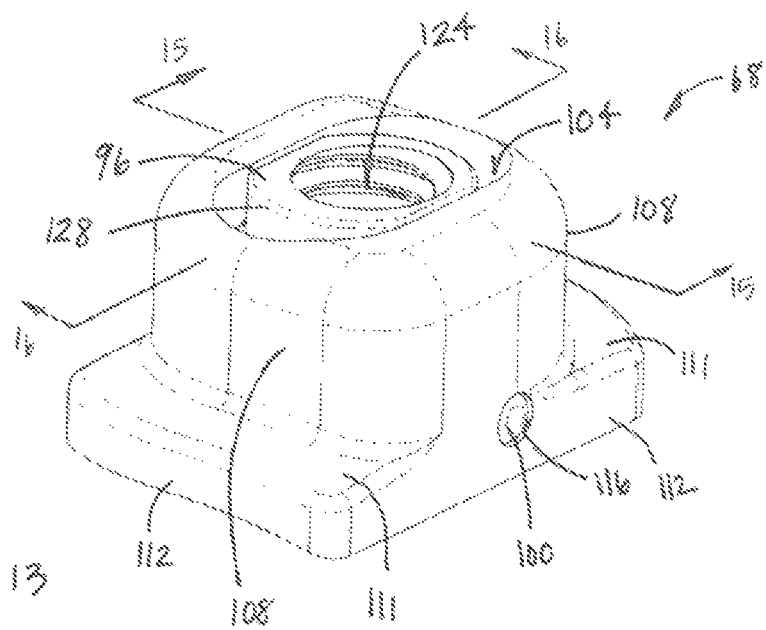

BICYCLE CONTROL DEVICE MOUNTING ASSEMBLY

Typical bicycle control devices such as brake levers and shift levers for bicycles and other handlebar-steerable vehicles are clamped to a handlebar. The clamp on typical bicycle control devices limits the shape of the handlebar to a circular cross-sectional profile. Attempts have been made to provide ergonomic handlebars by bending the circular cross-section tubing to more ergonomic shapes. However, bent handlebars are limited by their circular cross section and necessity to receive a circular clamp. Attempts to bolt the bicycle control device to the handlebars has resulted in limited adjustability and difficulty in taping. Additionally, bolt on handlebar arrangements have included a bolt protruding from the back side of the handlebar where it may interfere with the riders hand, thereby causing discomfort. Further, bolt on arrangements have been found to not provide adequate rigidity. In other words, bicycle control devices mounted to typical bolt on arrangements have been found to move or wiggle under heavy load by a user.

SUMMARY

According to one aspect, a bicycle handlebar assembly comprises a handlebar with a handlebar central axis and a handlebar opening disposed in the handlebar a distance removed from an end of the handlebar. The bicycle handlebar assembly comprises a bicycle control device mounting assembly received in the handlebar opening and disposed within the handlebar. The bicycle control device mounting assembly is accessible only through the handlebar opening. The bicycle control device mounting assembly is moveable relative to the handlebar central axis within a first mounting adjustment range.

According to another aspect, a bicycle control device mounting assembly is provided for mounting a bicycle control device to a bicycle handlebar having a handlebar central axis and a handlebar opening disposed in the handlebar a distance removed from an end of the handlebar. The bicycle control device mounting assembly comprises a connector assembly. The connector assembly comprises a first connector moveable relative to the handlebar central axis within a first mounting adjustment range and a second connector moveable relative to the handlebar central axis within a second mounting adjustment range.

BRIEF DESCRIPTION OF DRAWINGS

FIG. 13 is a top, right side perspective view a connector assembly of the bicycle control device mounting assembly of FIG. 11;

FIG. 14 is a bottom left side perspective view of the connector assembly FIG. 13;

Other aspects and advantages of the embodiments disclosed herein will become apparent upon consideration of the following detailed description, wherein similar or identical structures have similar reference numerals.

DETAILED DESCRIPTION

Figure 1:
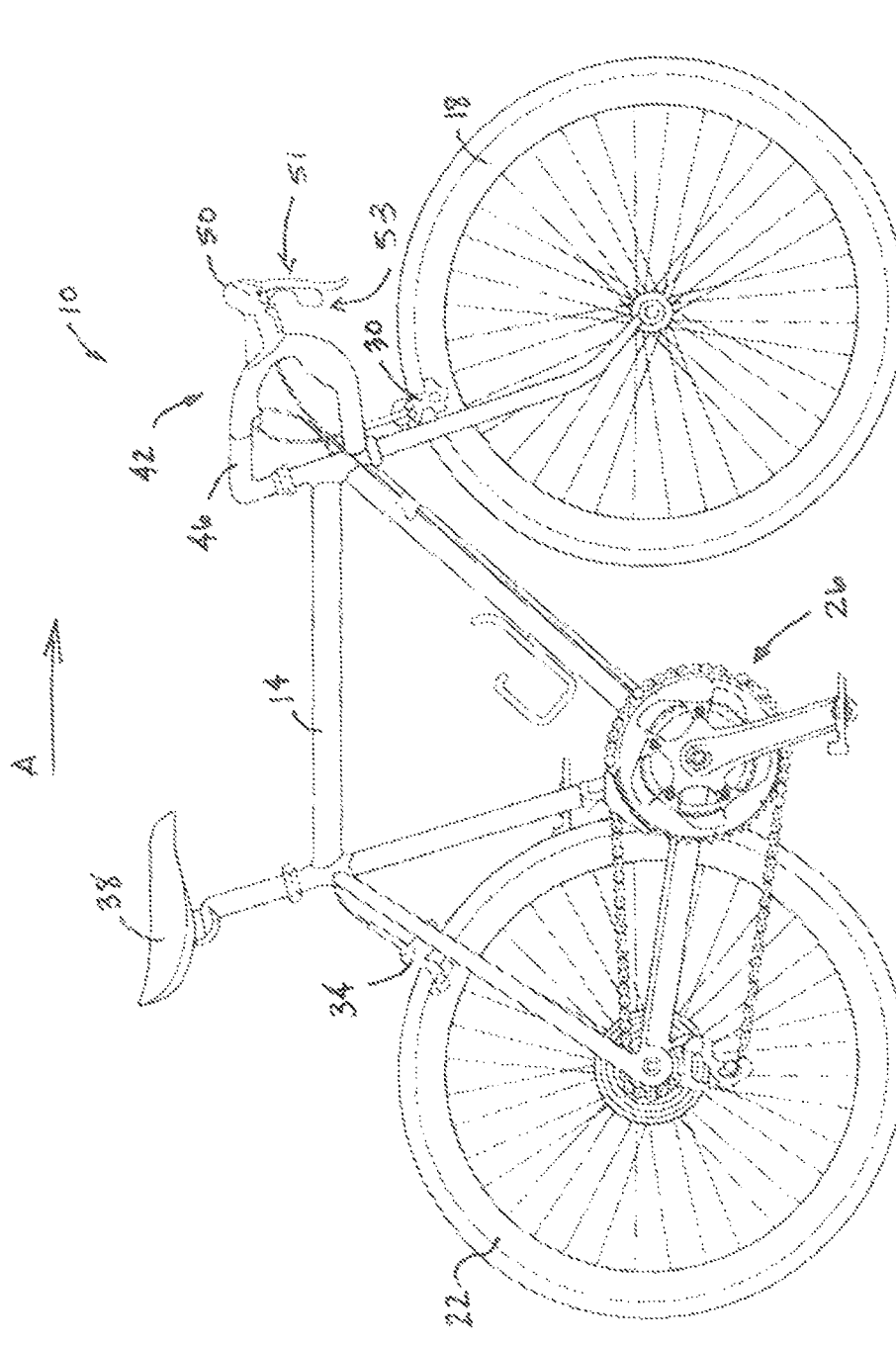
FIG. 1 is a right side elevational view of a bicycle according to one embodiment.

With reference to the disclosure herein, a bicycle control device mounting assembly for a road bicycle is described. One exemplary bicycle control device mounting assembly for a bicycle 10 is depicted in FIG. 1. However, the present disclosure is practicable with other bicycles and other handlebar-steerable vehicles, as desired. The bicycle 10 generally includes a frame 4 supported on a front wheel 18 and a rear wheel 22. A drivetrain 26 is arranged to provide power to the rear wheel 22, and a front brake 30 and a rear brake 34 are arranged to slow rotation of the front wheel 18 and the rear wheel 22, respectively. A saddle 38 is provided for use by a rider. Further, a handlebar assembly 42 is arranged to control the direction of the front wheel 18 and communicate with the drivetrain 26, the from brake 30, and the rear brake 34 to control operation thereof. The front and/or forward orientation of the bicycle 10 is indicated by the direction of arrow A. As such, a forward direction of movement for the bicycle is indicated by the direction of arrow A.

It is to be understood that the specific arrangement and illustrated components of the frame 14, front wheel 18, rear wheel 22, drivetrain 26, front brake 30, rear brake 34, and saddle 38 are nonlimiting to the disclosed, embodiments. For example, while the front brake 30 and the rear brake 34 are illustrated as hydraulic rim brakes, hydraulic disc brakes or mechanical brake systems (both rim and disk) are contemplated and encompassed within the scope of the disclosure. Additionally, while the illustrated bicycle 10 is a road bicycle, the embodiments disclosed herein may be implemented with other types of bicycles such as, for example, mountain bicycles.

Figure 2:
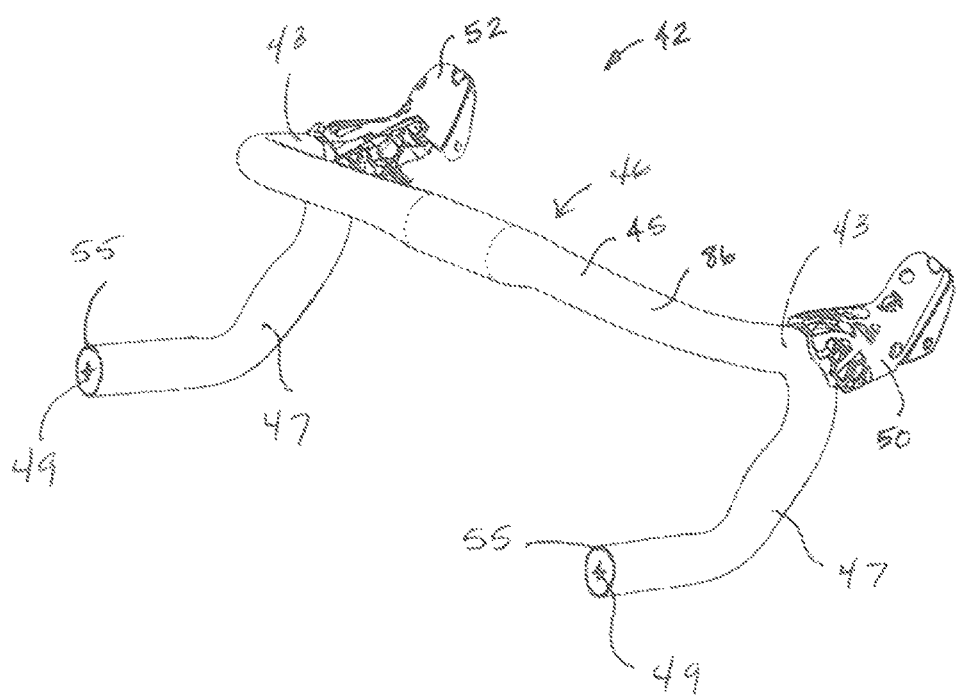
FIG. 2 is a top, right perspective view of a handlebar assembly of the bicycle of FIG. 1.

Turning to FIG. 2, the handlebar assembly 42 includes a handlebar 46 with a handlebar central axis 49 extending along the handlebar 46, a right bicycle control device 50 (shown with levers and covers removed), and a left bicycle control device 52 (shown with levers and covers removed). The handlebar central axis 49 may be straight or curved. Looking to FIG. 1, each of the illustrated right and left bicycle control devices includes a brake lever assembly 51 and, a shift lever assembly 53. The right shift lever assembly controls operation of a rear derailleur (part of the drivetrain 26) and right brake lever assembly controls operation of the rear brake 34 while the left shift lever assembly controls a front derailleur (part of the drivetrain 26) and the left brake lever assembly controls the front brake 30. In other embodiments, the right and left bicycle control devices may include only a brake lever assembly or only a shift lever assembly. Further, in other embodiments, the bicycle control device may control other bicycle components such as a bicycle suspension or a seat post. The illustrated handlebar 46 is a drop-style handlebar that includes two bicycle control device mounting portions 43, a top handgrip portion 45 and two drop-down handgrip portions 47. One of the bicycle control device mounting portions 43 is disposed between the top handgrip portion 45 and one of the drop-down handgrip portions 47 and the other of the bicycle control device mounting portions 43 is disposed between the top handgrip portion 45 and the other of the drop-down handgrip portions 47. The gripping features may have non-uniform cross-sectional profiles. In other embodiments, different handlebar styles may be employed (e.g., bullhorn, flat, riser, etc.), as desired.

Figure 3:
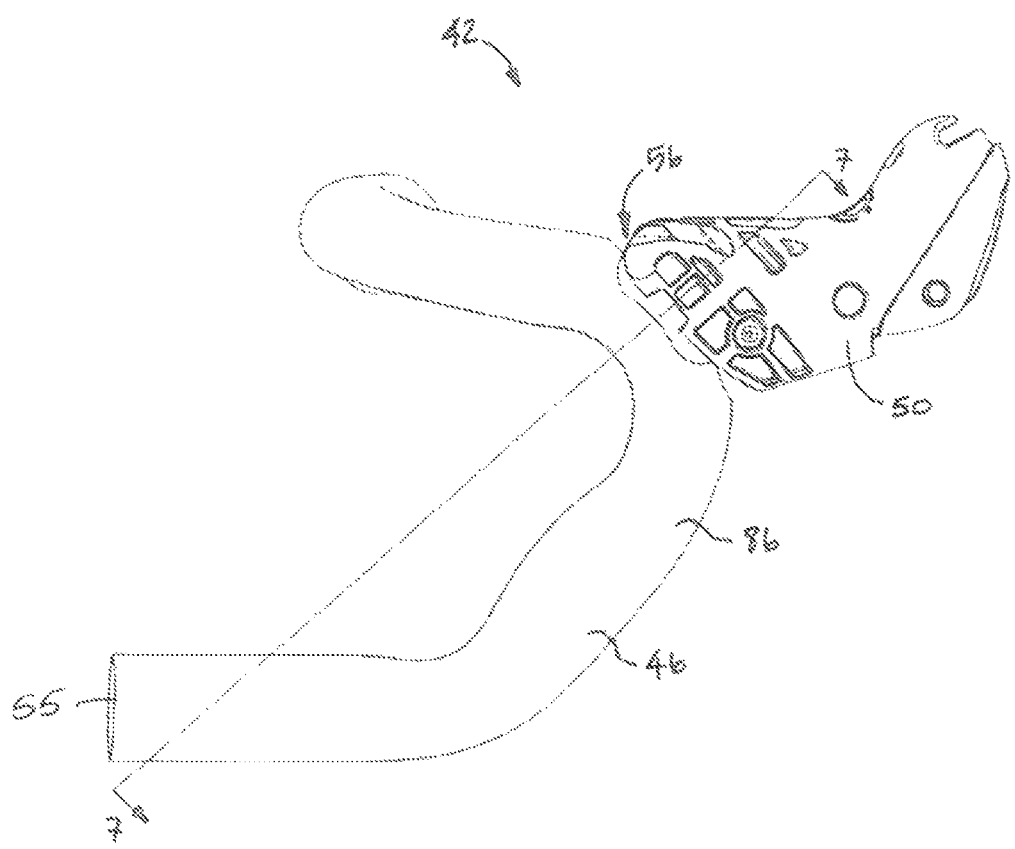
FIG. 3 is a right side elevational view of the handlebar assembly of FIG. 2.
Figure 4:
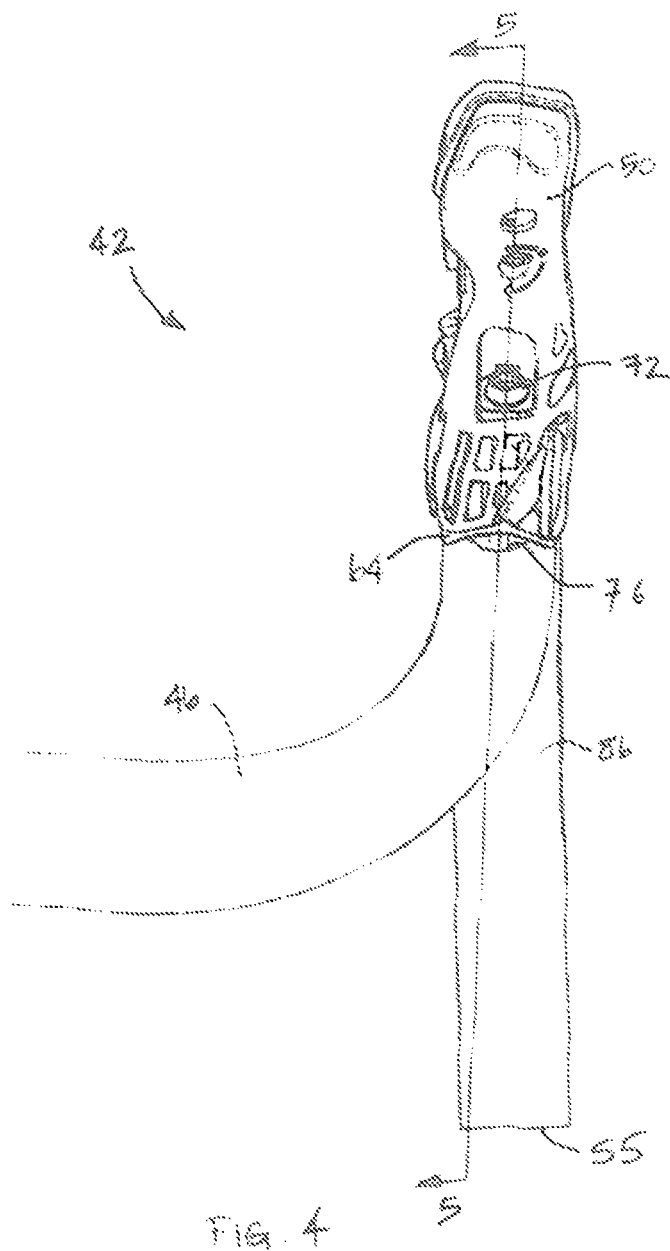
FIG. 4 is a partial, top plan view of the right side of the handlebar assembly of FIG. 2.
Figure 5:
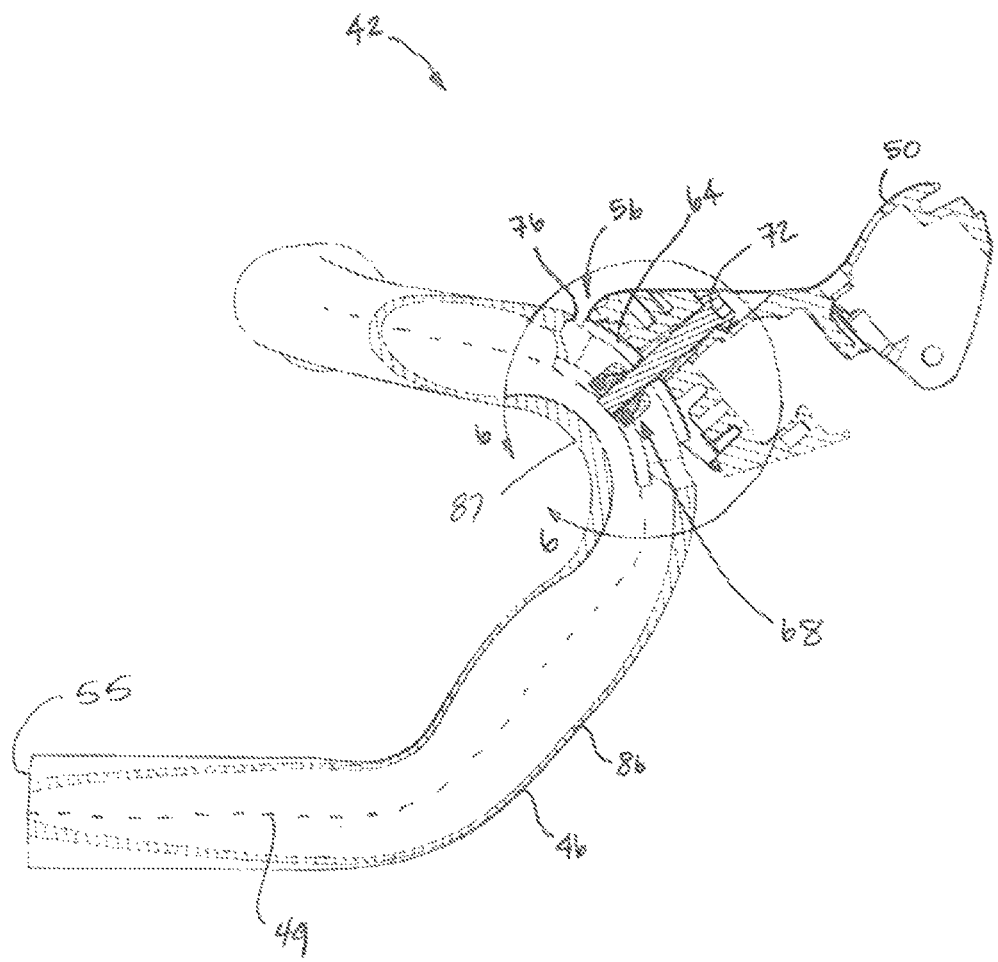
FIG. 5 is a sectional view of the handlebar assembly of FIG. 2 taken along the line 5-5 FIG. 4.

FIGS. 3 and 4 show the right bicycle control device 50 coupled to the handlebar 46 via connection to a bicycle control device mounting assembly 56. The bicycle control device mounting assembly 56 is shown in more detail in FIGS. 5 and 6 and may include a cover 64, a connector assembly 68 and a fastener 72, in this embodiment a bolt. The handlebar 46 may include a handlebar opening 76, an interior catch, in this embodiment a groove 80, and an interior clearance space 84 for receiving the bicycle control device mounting assembly 56. The handlebar opening 76 is disposed or formed in the handlebar a distance removed from an end 55 of the handlebar 46. The handlebar 46 includes a wall or sidewall 86. A portion 87 of the sidewall 86 opposite the handlebar opening 76 provides an uninterrupted gripping surface for the user. In other words, the handlebar opening 76 is a non-through opening or blind opening.

Figure 8:
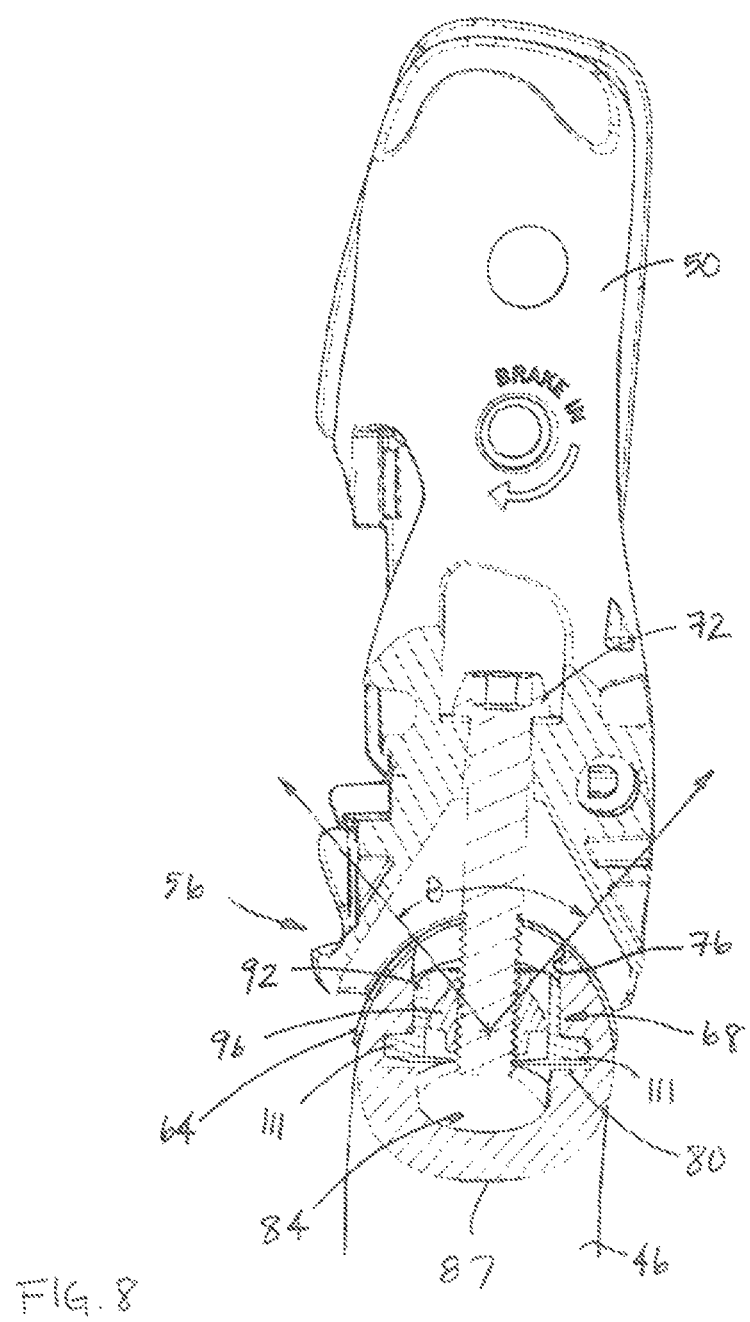
FIG. 8 is a detail view of the handlebar assembly of FIG. 2 taken within the line 8-8 of FIG. 7.
Figure 11:
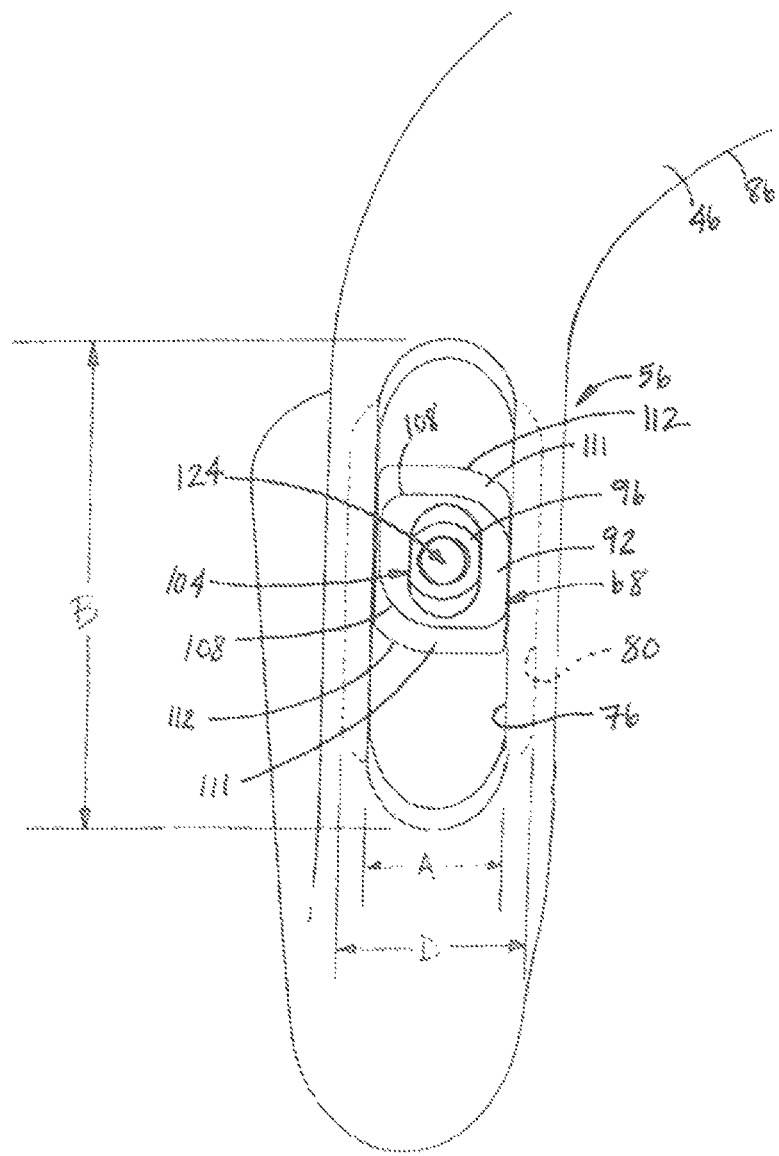
FIG. 11 is a detail view of a bicycle control device mounting assembly of the handlebar assembly of FIG. 10 in a first position.

With reference to FIG. 11, the handlebar opening 76 is defined by the sidewall 86 of the handlebar 46 and has a width A of about 15 mm and a length B of about 50 mm with rounded edges. The illustrated length B provides a first mounting adjustment range (see FIG. 6) of a position of the right bicycle control device 51) along the handlebar central axis 49 in the handlebar opening 76. In other words, with reference to FIG. 6, the right bicycle control device's 50 position on the handlebar 46 may be moved along the handlebar central axis 49 within a range of 50 mm (as viewed in FIG. 5) according to a user's preference. Referring again to FIG. 11, the illustrated width A provides a second mounting adjustment range (see FIG. 8) of a position of the right bicycle control device 50 about the handlebar central axis 49 within a range, such as an angle θ. In this embodiment, the angle θ is about eighty degrees (80°). In other words, with continued reference to FIG. 8, the right bicycle control device's 50 position on the handlebar 46 may be rotated clockwise or counterclockwise (as viewed in FIG. 8) within about an eighty degree (80°) window according to the user's preference. In other embodiments, the handlebar opening 76 may have a variety of different widths and lengths.

Figure 6:
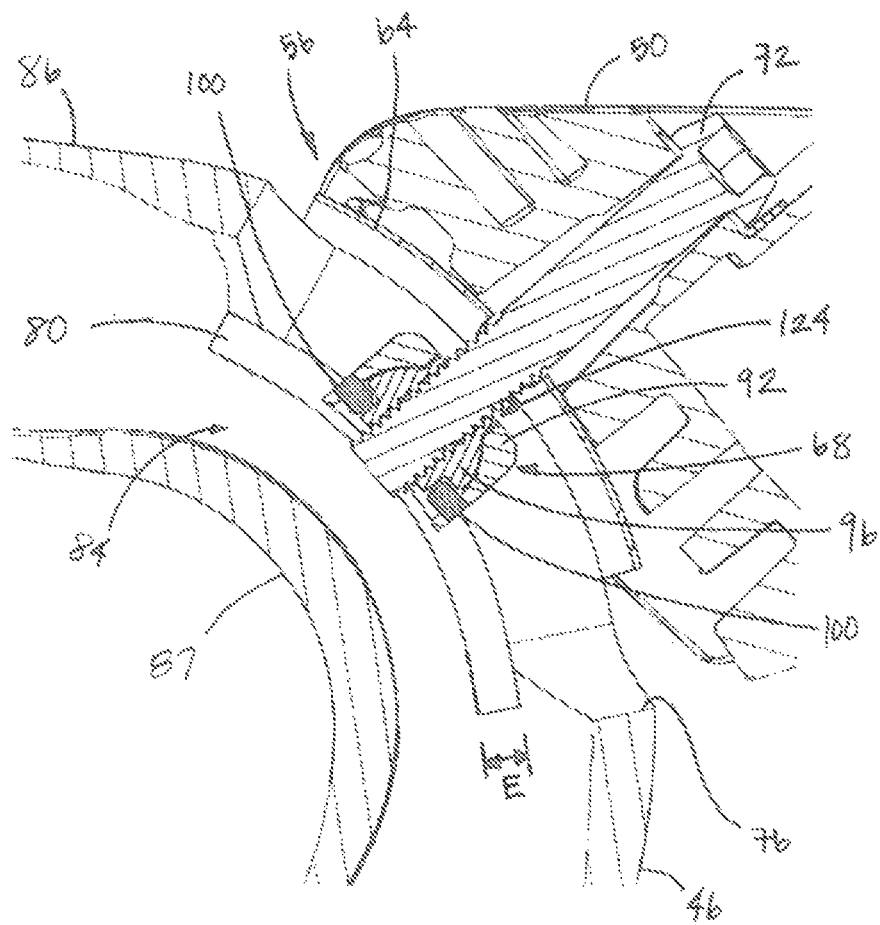
FIG. 6 is a detail view of the handlebar assembly of FIG. 2 taken along in the line 6-6 of FIG. 5.
Figure 7:
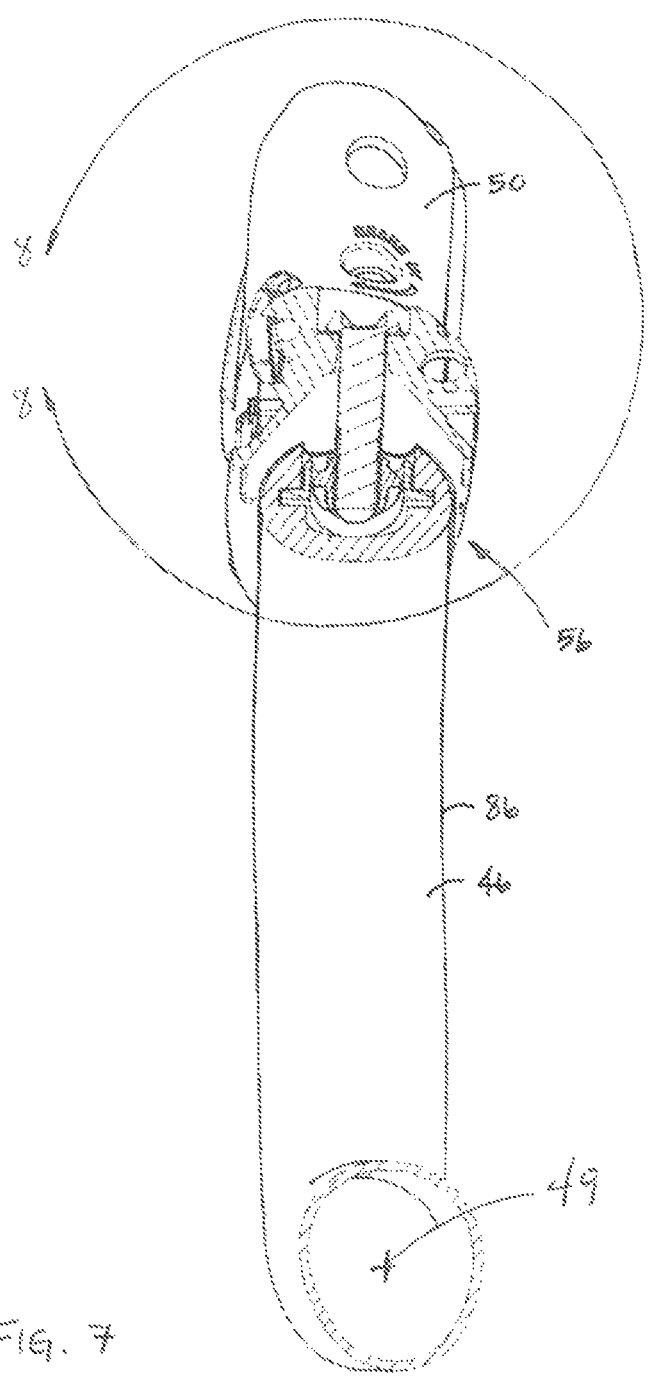
FIG. 7 is a sectional view of the handlebar assembly of FIG. 2 taken along the line 7-7 of FIG. 3.
Figure 9:
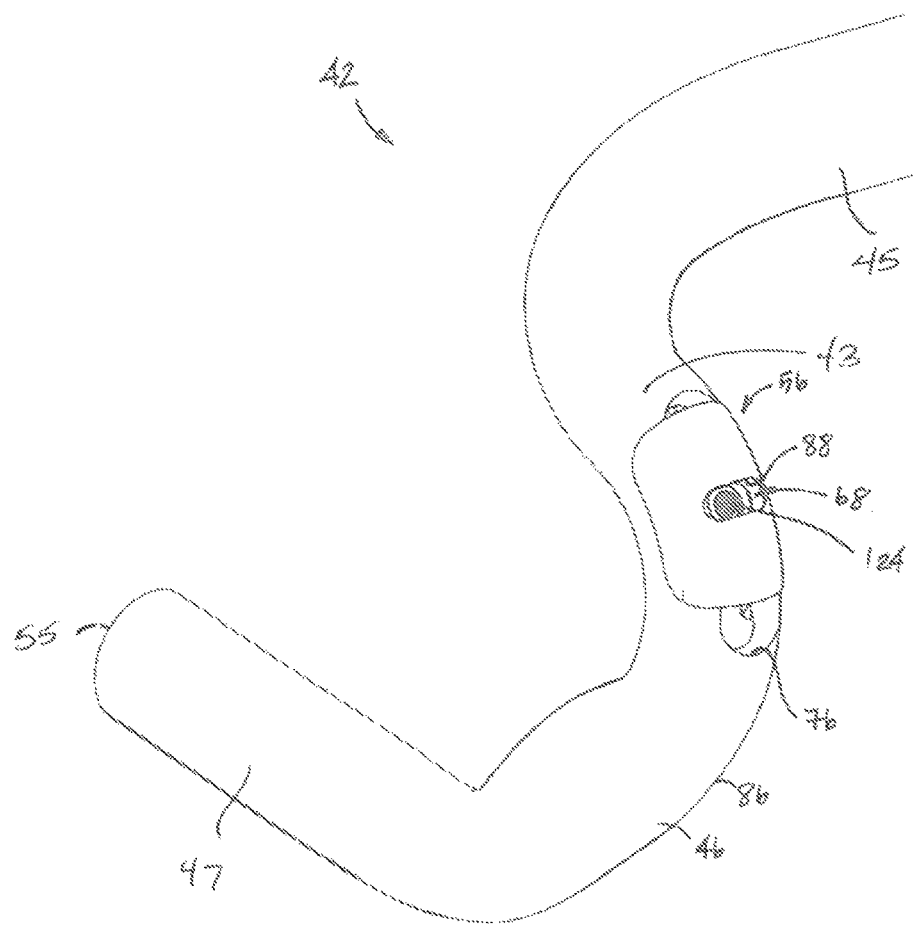
FIG. 9 is a partial, top, right side perspective view of the handlebar assembly of FIG. 2 with a right bicycle control device removed.
Figure 10:
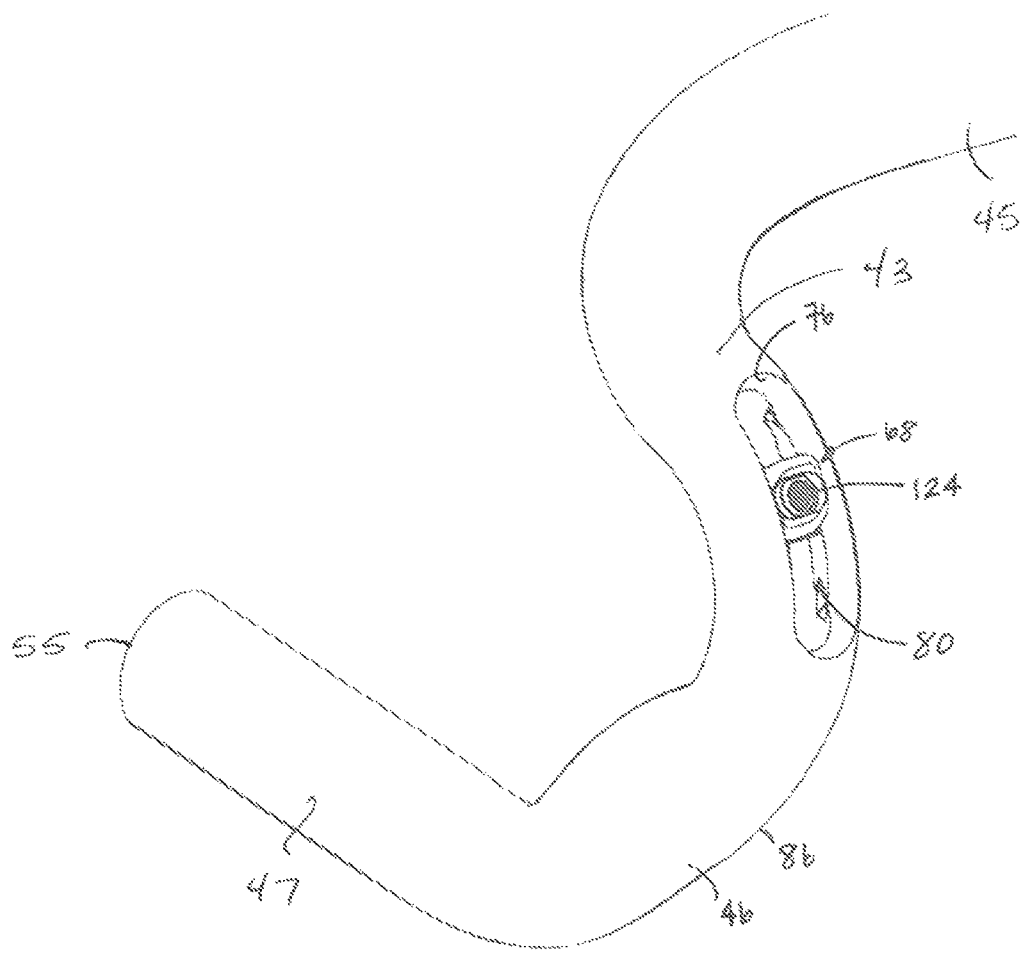
FIG. 10 is a similar view to that shown in FIG. 9 with a cover removed.

In the illustrated embodiment, the groove 80 has a width D of about 20 mm (see FIG. 11) and a depth E of about 3 mm (see FIG. 6). The groove 80 also has a length corresponding to the length B of the handlebar opening 76 such that the first mounting adjustment range is not affected by the groove 80. In the illustrated embodiment, the groove 80 has a length that is less than the length B of the handlebar opening 76, but in other embodiments the length of the groove 80 may be equal in length or longer than the length B of the handlebar opening 76. Turning to FIG. 9, the cover 64 has a width larger than the width A of the handlebar opening 76 and larger than a footprint of the right bicycle control device 50 such that the right bicycle control device 50 is supported on the cover 64 when installed on the handlebar 46. The cover 64 includes a cover opening 88, such as a slot, sized to receive the fastener 72 and permit angular adjustment of the right bicycle control device 50 within the second mounting adjustment range. The cover 64 is arranged to move with the right bicycle control device 50 within the first mounting adjustment range. The cover is designed to cover the opening 76 in the handlebar 46, provide a support surface for the bicycle control device 50, provide a frictional engagement with the bicycle control device, and/or provide a damping surface. The illustrated cover 64 is constructed from a metal such as aluminum, however, it is contemplated that the cover may be constructed of another metal, a plastic, carbon fiber or other material, as desired.

FIGS. 13-16 depict the connector assembly 68, which includes a first connector 92, a second connector 96, and two pins 100. The connector assembly 68 is disposed within the handlebar 46 (see FIG. 6). The first connector 92 includes a fastener clearance opening 104 baying an oval profile sized to permit angular adjustment of the right bicycle control device 50 about the handlebar central axis 49 within the second mounting adjustment range. The first connector 92 further includes a first cam profile 108 (most clearly seen in FIGS. 11 and 12) sized to engage the handlebar opening 76, two flanges 111 that include second cam profiles 112 sized to be received within and engage the groove 80 of the handlebar 46, two pin apertures 116 sized to receive the pins 100 via interference fit (see FIGS. 15 and 16), and an interior dome 120. The pins 100 are positioned such that they are fixed relative to the first connector 92 and extend into the interior dome 120.

The second connector 96, in this embodiment a nut, includes a threaded through hole 124 sized to receive the fastener 72, a double D top profile 128 sized such that the flats of the double D are received within the fastener clearance opening 104 of the first connector 91 an exterior dome 132 sized and shaped to slidingly engage the interior dome 120, and a shoulder 136 arranged to engage the pins 100 and trap the second connector 96 between the interior dome 120 and the pins 100. The exterior dome 132 has a shape corresponding to a shape of the interior dome 120. The assembled connector assembly 68 provides the first connector 92 defining the two cam profiles 108, 112 arranged to engage surfaces defining the handlebar opening 76, and the second connector 96 that pivots or rotates relative to the first connector 92. The movement of the first connector 92 within the handlebar opening 76 provides adjustment along the handlebar central axis 49 within the first mounting adjustment range and the pivoting of the second connector 96 relative to the first connector 92 provides angular adjustment about the handlebar central axis 49 within the second mounting adjustment range. In other words, the first connector 92 is slidable within the groove 80 and the second connector 96 is pivotable relative to the first connector 92.

In operation, to install the right bicycle control device 50 onto the handlebar 46, the connector assembly 68 is arranged in a first position, as shown in FIG. 11, wherein counterclockwise rotation is inhibited by the first cam profile 108. Then, the cover 64 is placed over the connector assembly 68 such that the threaded through hole 124 of the second connector 96 is accessible through the cover opening 88 formed in the cover 64. The right bicycle control device 50 is then positioned on the handlebar 46 and the fastener 72 is passed through the right bicycle control device 50 and into engagement with the threaded through hole 124 (see FIG. 5).

Figure 12:
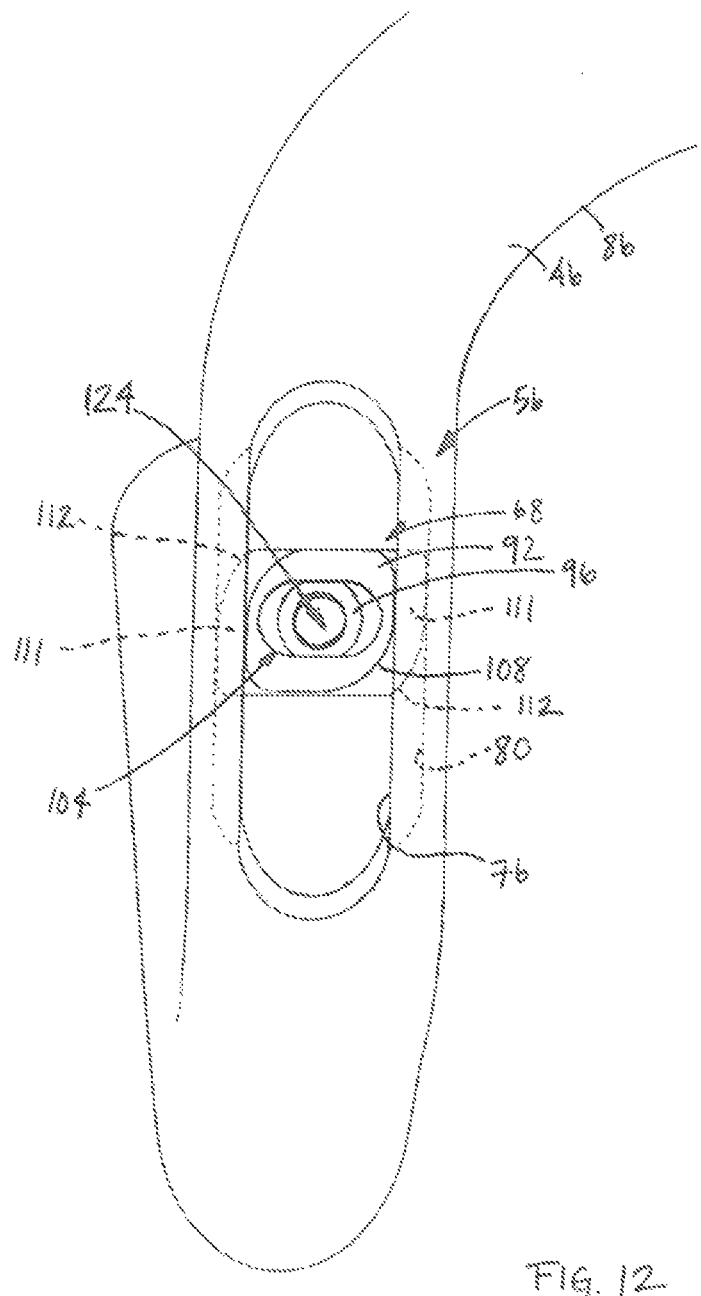
FIG. 12 is a detail view of the bicycle control device mounting assembly of FIG. 11 in a second position.
Figure 15:
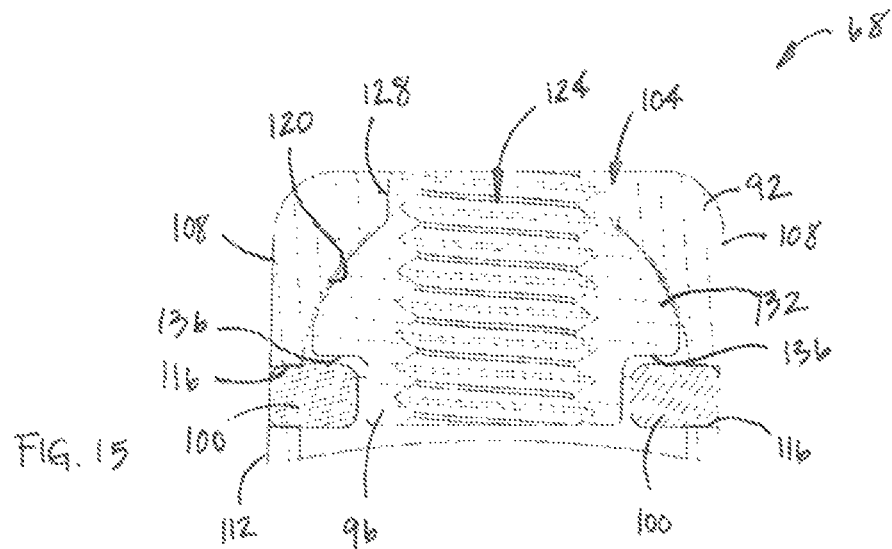
FIG. 15 is a sectional view of the connector as FIG. 11 taken along line 15-15 of FIG. 13.
Figure 16:
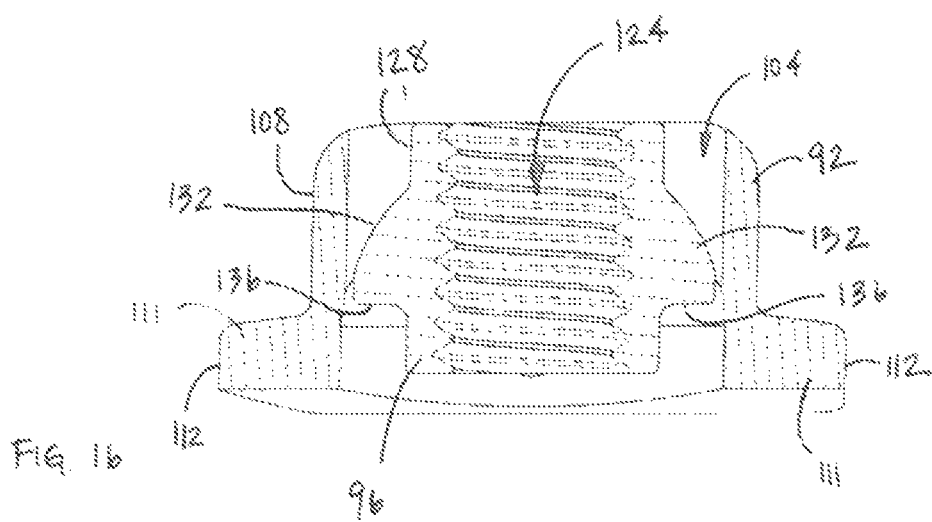
FIG. 16 is a sectional view of the connector assembly of FIG. 11 taken along 16-16 of FIG. 13.

With reference to FIGS. 11 and 12, with the fastener 72 engaged with the threaded through hole 124, continued rotation of the fastener 72 draws the right bicycle control device 50 toward the second connector 96, causing the exterior dome 132 of the second connector to contact the interior dome 120 of the first connector 92. The double D profile 128 engages surfaces defining the fastener clearance aperture 104, and the connector assembly 68 rotates into the second position, in which the flanges 111 enter the groove 80, as shown in FIG. 12. In the second position, the first cam profile 108 engages surfaces defining the handlebar opening 76 and the second cam profile 112 engages the groove 80 (see FIG. 12) and inhibits further clockwise rotation of the connector assembly 68 such that the fastener 72 can be threaded into the through hole 124. With the connector assembly 68 in the second position, the right bicycle control device 50 may be positioned as desired by the user. In other words, the user may adjust the position of the right bicycle control device 50 by sliding the flanges 111 of the first connector 92 within the groove 80 along the first mounting adjustment range and pivoting or rotating the second connector 96 about the pins 100 relative to the first connector 92 within the second mounting adjustment range (see FIGS. 6 and 8, respectively).

When the right bicycle control device 50 is positioned as desired, the fastener 72 is tightened and the engagement of the first and second cam profiles 108, 112 allows the fastener 72 to be threaded into the connector assembly 68 and tightened to a specified value (e.g., 12 Nm) such that the right bicycle control device 50 is maintained in place and secured.

To move or adjust the position, or to remove the right bicycle control device 50, the fastener 72 is loosened by counterclockwise rotation, resulting in the rotation of the connector assembly 68 from the second position (see FIG. 12) to the first position (see FIG. 11). In the first position, the first cam profile 108 engages surfaces defining the handlebar opening 76 and inhibits further counterclockwise rotation of the connector assembly 68 such that the fastener 72 can be unthreaded to the desired degree (e.g., loosened to re-adjust the position or fully unthreaded to remove the right bicycle control device 50 from the handlebar 46).

While the above description is made with reference to the right bicycle control device 50, the left bicycle control device 52 is mirrored and the bicycle control device mounting assembly 56 on the left side of the handlebar 46 is identical to the bicycle control device mounting assembly 56 on the right side of the handlebar 46.

Figure 17:
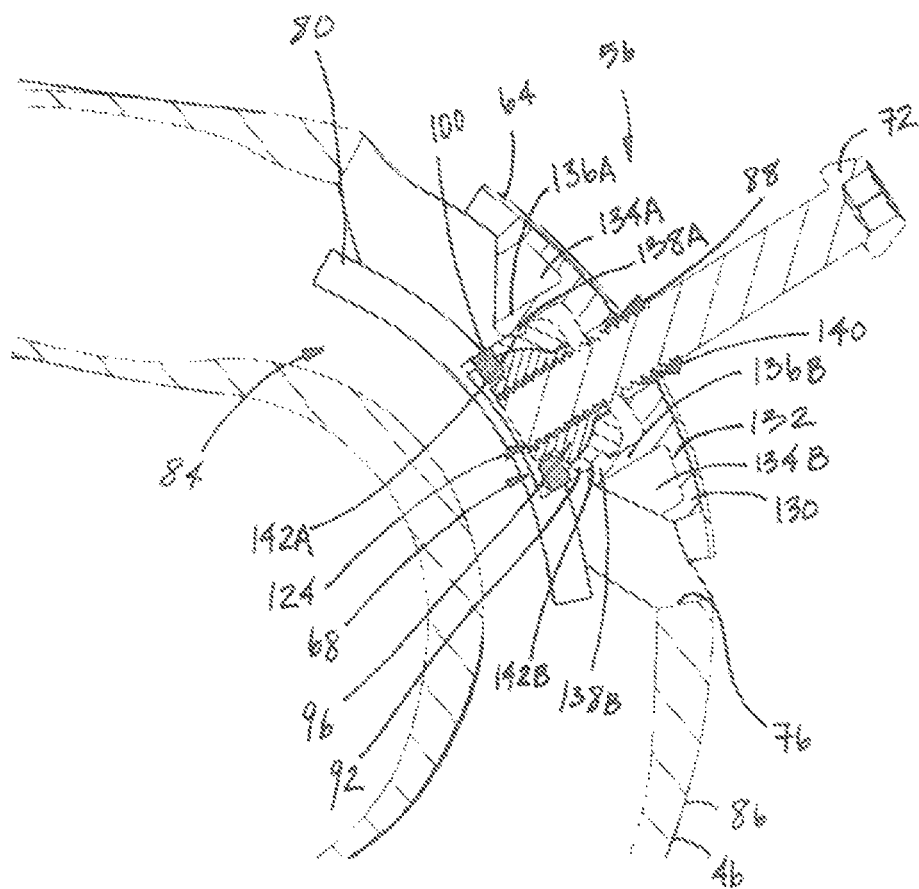
FIG. 17 is a sectional view of an alternative embodiment of a handlebar assembly with a bicycle control device removed.
Figure 18:
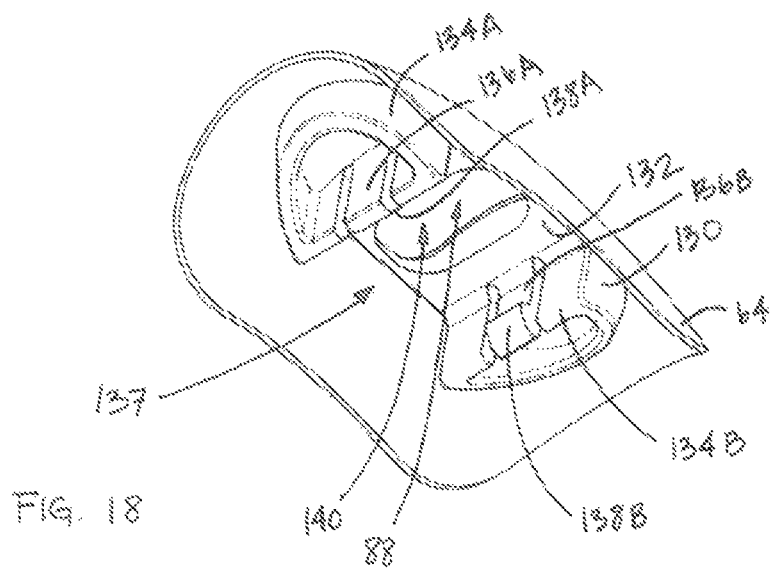
FIG. 18 is a bottom side perspective view of a cover of the handlebar assembly of FIG. 17.
Figure 19:
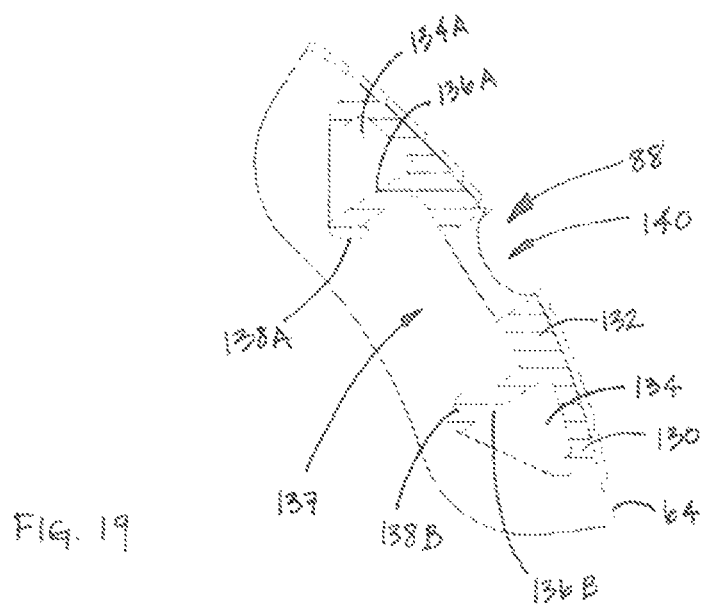
FIG. 19 is a sectional view of the cover of FIG. 18.

As illustrated in FIGS. 17-19, another embodiment of the handlebar assembly 42 includes a retention member 130 depending from an underside of the cover 64. The retention member 130 is attached to the cover 64 with an adhesive, soldering, or other attachment means. Alternatively, the cover 64 and the retention member 130 may be a unitary piece. The retention member 130 includes a generally oval shaped base 132 and first and second members 134A, 134B extending from opposing ends of the base 132. The first and second members 134A, 134B include first and second arms 136A, 136B, respectively, and define a space 137 there between. Hooks 138A, 138B are disposed at the distal ends of the first and second arms 136A, 136B. The base 132 also includes an opening 140 therein, which aligns with the cover opening 88 in the cover 64.

Referring now to FIG. 19, during installation the cover 64 and retention member 130 are placed over the connector assembly 68 so that the threaded through hole 124 is accessible through the cover opening 88 in the cover 64 and the opening 140 in the retention member 130. The bicycle control device (not shown) is then positioned on the handlebar 46 and the fastener 72 is passed through the bicycle control device and into engagement with the threaded through hole 124. With the fastener 72 engaged with the threaded through hole 174 initial rotation of the fastener 72 causes the connector assembly 68 to rotate into the second position, as discussed above. In the second position, further clockwise rotation of the connector assembly 68 is inhibited by the first cam profile 108 engaging surfaces defining the opening 76 and the second cam profile 112 engaging the groove 80 (see FIG. 12). Further rotation of the fastener 72 draws the bicycle control device, cover 64, and retention member 130 toward the connector assembly 68 causing the retention member 130 to extend through the opening 76 into the handlebar 46. As the retention member 130 continues to move into the handlebar 46, the first and second members 134A, 134B frictionally engage sides of the first connector 92 causing the first and second arms 136A, 136B to flex outwardly allowing the connector assembly 68 to enter the space 137. The first and second arms continue to move along the side of the first connector 92 until the hooks 138A, 138B engage with detents 142A, 142B in the side of the first connector 92, thereby locking the connector assembly 68 in the second position. The bicycle control device can then be positioned and the fastener 72 tightened to maintain the position of the bicycle control device as discussed above. In other embodiments, different sized and shaped retention members may be used to perform the above-described function.

The bicycle control mounting assembly 56 provides the ability to utilize different non-standard cross-sectioned handlebar geometries, such as an ergonomically shaped handlebar 46, while still allowing the user to adjust the position of the bicycle control devices 50, 52. By eliminating the traditional circular clamp used in typical bicycle control devices, the bicycle control device mounting assembly 56 separates the geometry of the handlebar 46 from the ability to mount the bicycle control device. In turn, non-circular handlebar geometries may be utilized and provide better control and increased comfort to the user. Additionally, the bicycle control device mounting assembly 56 allows the bicycle control devices 50, 52 to be adjustable along the handlebar central axis 49 within the first mounting adjustment range and about the handlebar central axis 49 within the second mounting adjustment range, providing a highly customizable riding arrangement.

The bicycle control device mounting assembly 56 provides a number of advantages. As discussed above, non-circular cross sections may be utilized, thereby allowing the handlebar 46 to be more ergonomically efficient for the user. The cover 64 provides a non-slip or higher frictional contact surface and spreads the clamping forces, allowing the bicycle control devices 50, 52 to be rigidly secured to the handlebar 46 and to avoid slippage or wiggling during use. The side 86 provides the user with an uninterrupted gripping surface in the bicycle control device mounting portion 43. In other words, the bicycle control device mounting portion 43 of the handlebar 46 does not include a through hole so there is no mounting hardware present on the back side of the handlebar 46 where the user's hand rests. This arrangement provides for easier taping, less hand fatigue and a more ergonomical handlebar interface. Additionally, no specialty T-nuts or other, hardware are necessary to use the bicycle control device mounting assembly 56. In turn, loss of parts is reduced and the handlebar 46 may be used with a wider array of bicycle control devices 50, 52.

In an embodiment, a bicycle handlebar assembly includes a handlebar and a bicycle control device mounting assembly. The handlebar has a handlebar central axis and handlebar opening disposed in the handlebar a distance removed from an end of the handlebar. The bicycle control device mounting assembly is received in the handlebar opening and disposed within the handlebar. The bicycle control device mounting assembly is accessible only through the handlebar opening. The bicycle control device mounting assembly is moveable relative to the handlebar central axis within a first mounting adjustment range. The first mounting adjustment range may provide an adjustment along the handlebar central axis. The first mounting adjustment range may provide the adjustment along the handlebar central axis within a range of about 50 millimeters. The bicycle control device mounting assembly may be moveable relative to the handlebar central axis within a second mounting adjustment range. The second mounting adjustment range may provide an angular adjustment about the handlebar central axis. The second mounting adjustment range may provide the angular adjustment about the handlebar central axis within a range of about 80 degrees. The bicycle control device mounting assembly may include a connector assembly including a first connector moveable relative to the handlebar central axis within the first mounting adjustment range, and a second connector moveable relative to the handlebar central axis within a second mounting adjustment range. The first connector may be movable within the handlebar opening within the first mounting adjustment range. The second connector may be pivotably received by the first connector. The second connector may be pivotable relative to the first connector within the second mourning adjustment range. The handlebar may further include an interior catch disposed near the handlebar opening. The first connector may be retained by the interior catch. The first connector may include a first cam profile arranged to selectively engage surfaces defining the handlebar opening and inhibit rotation of the first connector. The first connector may include a second cam profile arranged to engage the interior catch. The connect assembly may be rotatable between a first position where counter-clockwise rotation is inhibited and a second position where clockwise rotation is inhibited. The first connector may be slidable within the handlebar opening within the first mounting adjustment range. The second connector may include an exterior dome having a shape corresponding to a shape of an interior dome formed in the film connector. The bicycle control device mounting assembly may further include a cover arranged to cover at least a portion of the handlebar opening. The cover may provide a higher frictional contact surface than a surface of the bicycle control device mounting portion. The cover may include a cover opening arranged to allow adjustment of the second connector within the second mounting adjustment range. The cover may include a retention member sized and shaped to engage the connector assembly. A portion of a sidewall of the handlebar opposite the handlebar opening may provide an uninterrupted gripping surface. The handlebar may include a non-uniform cross-sectional profile. The handlebar opening may be formed in the non-uniform cross-sectional profile.

In an embodiment, a bicycle control device mounting assembly is provided to mount a bicycle control device to a bicycle handlebar having a handlebar central axis and a handlebar opening disposed in the handlebar a distance removed from an end of the handlebar. The bicycle control device mounting assembly includes a connector assembly receivable in the handlebar opening and disposable within the bicycle handlebar. The connector assembly includes a first connector moveable relative the handlebar central axis within a first mounting adjustment range, and a second connector moveable relative to the handlebar central axis within a second mounting adjustment range. The first mounting adjustment range may provide an adjustment along the handlebar central axis. The first mounting adjustment range may provide the adjustment along the handlebar central axis within a range of about 50 millimeters. The second mounting adjustment range may provide an angular adjustment about the handlebar central axis. The second mounting adjustment range may provide the angular adjustment about the handlebar central axis within a range of about 80 degrees. The first connector may be moveable within the handlebar opening within the first mounting adjustment range. The second connector may be pivotably received in the first connector. The second connector may be pivotable relative to the first connector within the second mounting adjustment range. The bicycle control device mounting assembly may further include a cover arranged to cover at least a portion of the handlebar opening. The cover may provide a higher frictional contact surface than a surface of the bicycle handlebar. The cover may include a cover opening arranged to allow adjustment of the second connector within the second mounting adjustment range. The cover may include a retention member sized and shaped to engage the connector assembly. The first connector may include a first cam profile selectively engageable with surfaces defining the handlebar opening and inhibit rotation of the first connector. The first connector may include a second cam profile engageable with an interior of the handlebar. The connector assembly may be rotatable between a first position where counter-clockwise rotation is inhibited and a second position where clockwise rotation is inhibited. The first connector may be slidable within the handlebar opening within the first mounting adjustment range. The second connector may include an exterior dome having a shape corresponding to a shape of an interior dome formed in the first connector.

The illustrations of the embodiments described herein are intended to provide a general understanding of the structure of the various embodiments. The illustrations are not intended to serve as a complete description of all of the features of devices, assemblies and systems that utilize the structures or methods described herein. Many other embodiments may be apparent to those of skill in the art upon reviewing the disclosure. Other embodiments may be utilized and derived from the disclosure, such that structural and logical substitutions a changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described this specification the context of separate embodiments can also be implemented it combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combination.

One or more e embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adoptions or variations of various embodiments. Combinations of the above embodiments, and other embodiments not specifically described herein, are apparent to those of skill in the art upon reviewing the description.

The Abstract of the Disclosure is provided to comply with 37 C.F.R. 2(b) and is submitted with the understanding that it will not be used to interpret or limit the scope or meaning of the claims. In addition, in the foregoing Detailed Description various features may be grouped together or described in a single document for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

Numerous modifications to the embodiments disclosed herein will be apparent to those skilled in the art in view of the foregoing description. For example, any of the embodiments disclosed herein may be modified to include any of the structures and/or methodologies disclosed in connection with different embodiments. Accordingly, this disclosure is to be construed as illustrative only and is presented for the purpose of enabling those skilled in the art to make and use the invention and to teach the best mode of carrying out same. The exclusive rights to all modifications which come within the scope of the appended claims are reserved.

What is claimed is:

1. A bicycle handlebar assembly, comprising:
a handlebar with a handlebar central axis and a handlebar opening disposed in the handlebar a distance removed from an end of the handlebar; and
a bicycle control device mounting assembly comprising a connector assembly received in the handlebar opening and disposed within the handlebar, the connector assembly only accessible through the handlebar opening, the bicycle control device mounting assembly moveable relative to the handlebar central axis within a first mounting adjustment range,
the connector assembly including:
a first connector moveable relative to the handlebar central axis within the first mounting adjustment range, and
a second connector moveable relative to the handlebar central axis within a second mounting adjustment range.

2. The bicycle handlebar assembly of claim 1, wherein the first mounting adjustment range provides an adjustment along the handlebar central axis.

3. The bicycle handlebar assembly of claim 2, wherein the first mounting adjustment range provides the adjustment along the handlebar central axis within a range of about 50 millimeters.

4. The bicycle handlebar assembly of claim 1, wherein the bicycle control device mounting assembly is moveable relative to the handlebar central axis within a second mounting adjustment range.

5. The bicycle handlebar assembly of claim 4, wherein the second mounting adjustment range provides an angular adjustment about the handlebar central axis.

6. The bicycle handlebar assembly of claim 5, wherein the second mounting adjustment range provides the angular adjustment about the handlebar central axis within a range of about 80 degrees.

7. The bicycle handlebar assembly of claim 1, wherein the first mounting adjustment range provides an adjustment along the handlebar central axis.

8. The bicycle handlebar assembly of claim 1, wherein the second mounting adjustment range provides an angular adjustment about the handlebar central axis.

9. The bicycle handlebar assembly of claim 1, wherein the first connector is movable within the handlebar opening within the first mounting adjustment range, the second connector pivotably received by the first connector, the second connector pivotable relative to the first connector within the second mounting adjustment range.

10. The bicycle handlebar assembly of claim 1, wherein the handlebar further comprises an interior catch disposed near the handlebar opening, the first connector retained by the interior catch.

11. The bicycle handlebar assembly of claim 1, wherein the first connector includes a first cam profile arranged to selectively engage surfaces defining the handlebar opening and inhibit rotation of the first connector.

12. The bicycle handlebar assembly of claim 11, wherein the handlebar further comprises an interior catch disposed near the handlebar opening, the first connector including a second cam profile arranged to engage the interior catch.

13. The bicycle handlebar assembly of claim 1, wherein the connector assembly is rotatable between a first position where counter-clockwise rotation is inhibited and a second position where clockwise rotation is inhibited.

14. The bicycle handlebar assembly of claim 1, wherein the first connector is slidable within the handlebar opening within the first mounting adjustment range.

15. The bicycle handlebar assembly of claim 1, wherein the second connector includes an exterior dome having a shape corresponding to a shape of an interior dome formed in the first connector.

16. The bicycle handlebar assembly of claim 1, wherein the bicycle control device mounting assembly further comprises a cover arranged to cover at least a portion of the handlebar opening.

17. The bicycle handlebar assembly of claim 16, wherein the cover provides a higher frictional contact surface than a surface of the bicycle control device mounting portion.

18. The bicycle handlebar assembly of claim 16, wherein the cover includes a cover opening arranged to allow adjustment of the second connector within the second mounting adjustment range.

19. The bicycle handlebar assembly of claim 16, wherein the cover includes a retention member sized and shaped to engage the connector assembly.

20. The bicycle handlebar assembly of claim 1, wherein a portion of a sidewall of the handlebar opposite the handlebar opening provides an uninterrupted gripping surface.

21. The bicycle handlebar assembly of claim 1, wherein the handlebar comprises a non-uniform cross-sectional profile, the handlebar opening formed in the non-uniform cross-sectional profile.

22. A bicycle control device mounting assembly, comprising:
a bicycle handlebar having a handlebar central axis and a handlebar opening disposed in the handlebar a distance removed from an end of the handlebar; and
a connector assembly receivable in the handlebar opening and disposable within the bicycle handlebar, the connector assembly comprising:
a first connector moveable relative the handlebar central axis within a first mounting adjustment range, the first mounting adjustment range providing the adjustment along the handlebar central axis within a range of about 50 millimeters, and
a second connector moveable relative to the handlebar central axis within a second mounting adjustment range.

23. The bicycle control device mounting assembly of claim 22, wherein the second mounting adjustment range provides an angular adjustment about the handlebar central axis.

24. The bicycle control device mounting assembly of claim 23, wherein the second mounting adjustment range provides the angular adjustment about the handlebar central axis within a range of about 80 degrees.

25. The bicycle control device mounting assembly of claim 22, wherein the first connector is moveable within the handlebar opening within the first mounting adjustment range, the second connector pivotably received in the first connector, the second connector pivotable relative to the first connector within the second mounting adjustment range.

26. The bicycle control device mounting assembly of claim 22, further comprising a cover arranged to cover at least a portion of the handlebar opening.

27. The bicycle control device mounting assembly of claim 26, wherein the cover provides a higher frictional contact surface than a surface of the bicycle handlebar.

28. The bicycle control device mounting assembly of claim 26, wherein the cover includes a cover opening arranged to allow adjustment of the second connector within the second mounting adjustment range.

29. The bicycle control device mounting assembly of claim 26, wherein the cover includes a retention member sized and shaped to engage the connector assembly.

30. The bicycle control device mounting assembly of claim 22, wherein the first connector includes a first cam profile selectively engageable with surfaces defining the handlebar opening and inhibit rotation of the first connector.

31. The bicycle control device mounting assembly of claim 30, wherein the first connector includes a second cam profile engageable with an interior of the handlebar.

32. The bicycle control device mounting assembly of claim 22, wherein the first connector is slidable within the handlebar opening within the first mounting adjustment range.

33. A bicycle control device mounting assembly, comprising:
a bicycle handlebar having a handlebar central axis and a handlebar opening disposed in the handlebar a distance removed from an end of the handlebar; and
a connector assembly receivable in the handlebar opening and disposable within the bicycle handlebar, the connector assembly comprising:
a first connector moveable relative the handlebar central axis within a first mounting adjustment range, and
a second connector moveable relative to the handlebar central axis within a second mounting adjustment range, wherein the connector assembly is rotatable between a first position where counter-clockwise rotation is inhibited and a second position where clockwise rotation is inhibited.

34. A bicycle control device mounting assembly, comprising:
a bicycle handlebar having a handlebar central axis and a handlebar opening disposed in the handlebar a distance removed from an end of the handlebar; and
a connector assembly receivable in the handlebar opening and disposable within the bicycle handlebar, the connector assembly comprising:
a first connector moveable relative the handlebar central axis within a first mounting adjustment range, and
a second connector moveable relative to the handlebar central axis within a second mounting adjustment range, wherein the second connector includes an exterior dome having a shape corresponding to a shape of an interior dome formed in the first connector.

* * * * *